US012633430B2

(12) United States Patent
Jung et al.

(10) Patent No.: US 12,633,430 B2
(45) Date of Patent: May 19, 2026

(54) CONSTRUCTING METHOD FOR DELAYING CORROSION OF RADIOACTIVE WASTE DISPOSAL CONTAINER IN CONCRETE DISPOSAL VAULT

(71) Applicant: KOREA RADIOACTIVE WASTE AGENCY, Gyeongju-si (KR)

(72) Inventors: Hae Ryong Jung, Daejeon (KR); Min Seok Kim, Daejeon (KR); Chang Min Shin, Daejeon (KR); Seung Hyun Kim, Daejeon (KR); Hyung Ju Yun, Daejeon (KR); Sang Hwan Lee, Daejeon (KR); Man Ho Han, Daejeon (KR)

(73) Assignee: KOREA RADIOACTIVE WASTE AGENCY, Gyeongju-si (KR)

( * ) Notice: Subject to any disclaimer, the term of this patent is extended or adjusted under 35 U.S.C. 154(b) by 706 days.

(21) Appl. No.: 17/993,968

(22) Filed: Nov. 24, 2022

(65) Prior Publication Data

US 2023/0178261 A1 Jun. 8, 2023

(30) Foreign Application Priority Data

Nov. 25, 2021 (KR) ........................ 10-2021-0164524

(51) Int. Cl.
*G21F 9/30* (2006.01)

(52) U.S. Cl.
CPC .................................... *G21F 9/304* (2013.01)

(58) Field of Classification Search
CPC ........................................................ G21F 9/304
See application file for complete search history.

(56) References Cited

U.S. PATENT DOCUMENTS 3,617,588 A * 11/1971 Langman ............. A61K 9/4816 264/301
2006/0018817 A1* 1/2006 Ashby ........................ C01C 3/00 423/366
2021/0171410 A1* 6/2021 Yoshida ................... C09K 8/42

FOREIGN PATENT DOCUMENTS

GB 2295263 B * 7/1997 ............... G21F 9/12
JP 2021071473 A 5/2021
WO 2020091208 A1 5/2020

OTHER PUBLICATIONS

Andy Brunning. "Nuclear Waste and Its Disposal". Apr. 22, 2020. Retrieved Jun. 26, 2025. Retrieved from the Internet: <URL: https://www.compoundchem.com/2020/04/22/nuclear-waste/>. (Year: 2020).*
English machine translation of JP-2021071473-A. (Year: 2021).*

* cited by examiner

*Primary Examiner* — Paul A Wartalowicz
*Assistant Examiner* — Nicholas A. Piro
(74) *Attorney, Agent, or Firm* — NKL Law; Jae Youn Kim

(57) ABSTRACT

The present invention relates to a constructing method for delaying corrosion of radioactive waste disposal container in concrete disposal vault and, more specifically, to a constructing method for delaying corrosion of radioactive waste disposal container in concrete disposal vault in which backfill, placed to the top, combines pH control capsules, thereby dissolving the pH control capsules in rainwater, and a pH controller, inside, is discharged, thereby preventing decrease of pH of the backfill below 8.5 and delaying corrosion in the disposal containers, upon filling in backfill after placing radioactive waste disposal containers in the concrete vault.

4 Claims, 7 Drawing Sheets

CONSTRUCTING METHOD FOR DELAYING CORROSION OF RADIOACTIVE WASTE DISPOSAL CONTAINER IN CONCRETE DISPOSAL VAULT

TECHNICAL FIELD

The present invention relates to a constructing method for delaying corrosion of radioactive waste disposal container in concrete disposal vault and, more specifically, to a constructing method for delaying corrosion of radioactive waste disposal container in concrete disposal vault in which backfill, placed to the top, combines pH control capsules, thereby dissolving the pH control capsules in rainwater, and a pH controller, inside, is discharged, thereby preventing decrease of pH of the backfill below 8.5 and delaying corrosion in the disposal containers, upon filling in backfill after placing radioactive waste disposal containers in the concrete vault.

BACKGROUND ART

Referring to waste which comes from nuclear facilities and workplaces or laboratories, etc., handling radioactive materials, radioactive waste is classified into low and intermediate level radioactive waste and high level radioactive waste depending on degrees polluted by radioactive materials. Relevant Act stipulates that the definition of radioactive waste refers to radioactive materials or materials polluted by radioactive materials, resulting in materials to be eliminated. Examples are work items, etc., polluted during maintenance in nuclear facilities, items polluted during treatment in hospitals, and non-destructive inspections, etc., in industries. Further, the high-level radioactive waste is nuclear fuel, etc., which remains from power production in nuclear power plants. That is, radioactive waste is generated from all types of fields in which nuclear power is used in schools, hospitals, research institutes, industries, nuclear power plants, etc.

Disposal method of the low and intermediate level radioactive waste considers characteristics of underground hundreds of meters below depending on cases. Near Surface Disposal refers to a method of installing and reclaiming concrete vaults on the surface of the ground, and Rock Cavern Disposal is a method of excavating tunnels and silos to underground rock at least more than tens to hundreds of meters and reclaiming the inside for disposal. As for high-level radioactive waste (spent nuclear fuel), deep geological disposal is performed in the bedrock at a depth of 500~1,000 meters.

Method of disposing low and intermediate level radioactive waste varies from country to country and is determined by consideration of various aspects such as public emotions, economic feasibility, constructability, safety, etc. If disposal facilities are exposed to the air, shieldings are required for attenuating and blocking radiation which exists the inside of the disposal facilities. Also, enhancement of shielding structure for decreasing people's exposure level, consideration of public emotions, etc., are needed.

Stored to a rectangular concrete disposal container according to the standard, such radioactive waste is placed inside the disposal facility.

Explaining on the near surface disposal more specifically, new disposal facilities for decommissioning radioactive waste disposal of large-scale nuclear power plants have been planning and under construction in Gyeongju radioactive waste disposal. Among them, the near surface disposal, so called second-stage disposal, is targeted at below low level waste, currently promoting licensing.

In the second-stage near surface facility, a concrete disposal vault is constructed on the ground and a disposal container having radioactive waste is stored inside the disposal vault. Also, after finally finishing disposal, the vault is placed underground in a way of a technological wall which consists of soil, etc.

Such method for managing a vault of the near surface disposal, i.e., a repetitive step for placing disposal containers inside the vault; backfilling until the disposal containers are covered using cement mortar, as backfill; and placing the disposal containers on them after hardening and backfilling, is being used in similar types of disposal facilities abroad.

However, in such concrete vault, as rainwater gets through, pore water moves along from the upper concrete to the backfill (cement mortar), as illustrated in FIG. 1, it can be seen that pH is gradually decreased in spite of combination of Ordinary Portland Cement concrete (OPC) and fly-ash (FA), or combination of Ordinary Portland Cement concrete (OPC) and fly-ash (FA) and Silica Fume (SF).

Furthermore, as for the disposal containers, made up of metal, as illustrated in FIG. 2, it can be seen that corrosion happens to the radioactive waste disposal containers at approximately below pH 8.5, and radionuclide starts to leak due to corrosion.

DISCLOSURE

Technical Problem

For solving above problems, the object of the present invention is to provide a constructing method for delaying corrosion of radioactive waste disposal container in concrete disposal vault in which backfill, placed to the top, combines pH control capsules, thereby dissolving the pH control capsules in rainwater, and a pH controller, inside, is discharged, thereby preventing decrease of pH of the backfill below 8.5 and delaying corrosion in the disposal containers, upon filling in backfill after placing radioactive waste disposal containers in the concrete vault.

Technical Solution

To accomplish above objects, the present invention comprises: a disposal containers stacking process wherein disposal containers in which radioactive waste is stored are mutually spaced on the surface of a concrete vault, thereby stacking more than one layer; a backfill filling process wherein backfill is filled in the top of the disposal containers, wherein more than one layer is stacked; a repetitive process wherein a space is formed on the top of the concrete vault by repeating the stacking of the disposal containers and backfilling when the backfill is completely cured; a pH control backfill filling process wherein pH control backfill combining pH control capsules is filled and cured in the space formed to the top of the concrete vault; and a cover stacking process wherein a concrete cover is stacked to the top of the concrete vault for sealing.

Hereinafter, the pH control capsules are equipped with alkali metal powder inside and are made up of water-soluble cellulose ether shells for dissolving in rainwater and discharging the alkali metal powder.

Hereinafter, widths are all manufactured differently, thereby getting dissolved at different times.

Hereinafter, the pH control capsules maintains the pH of the backfill more than pH 8.6 in which the disposal containers are not corroded.

Hereinafter, the alkali metal powder combines any one or more than two of sodium (Na), potassium (K), lithium (Li), rubidium (Rb), cesium (Cs) and francium (Fr).

Advantageous Effects

According to a constructing method for delaying corrosion of radioactive waste disposal container in concrete disposal vault, constituted as above, enables to delay corrosion in the disposal containers by combining backfill, placed to the top, with pH control capsules; dissolving the pH control capsules in rainwater; and preventing decrease of pH of the backfill below 8.5 upon filling in backfill after placing radioactive waste disposal containers in the concrete vault.

DESCRIPTION OF THE PREFERRED EMBODIMENTS

The configuration of a constructing method for delaying corrosion of radioactive waste disposal container in concrete disposal vault of the present invention will be described in detail with the accompanying drawings.

In the following description of the present invention, a detailed description of known incorporated functions and configurations will be omitted when to include them would make the subject matter of the present invention rather unclear. Also, the terms used in the following description are defined taking into consideration the functions provided in the present invention.

The definitions of these terms should be determined based on the whole content of this specification, because they may be changed in accordance with the option of a user or operator or a usual practice.

Figure 1:
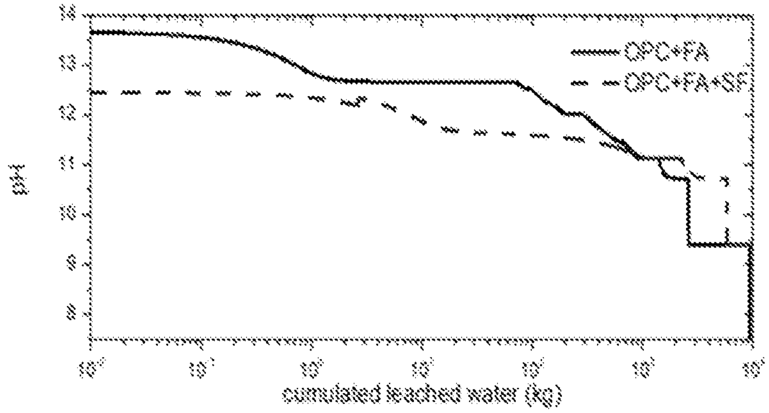
FIG. 1 illustrates a graph for explaining that a pH of Portland cement concrete is generally decreased due to rainwater for a long time.
Figure 2:
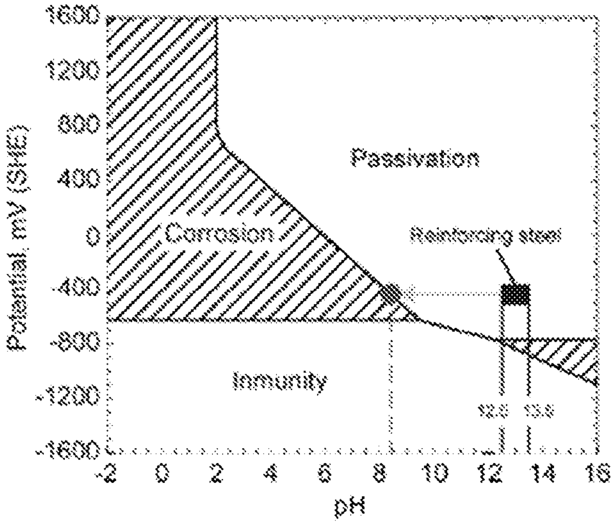
FIG. 2 illustrates steel's immunity, corrosion, and passivation domains as functions of pH and potential, highlighting corrosion onset pH and passivation pH.
Figure 3:
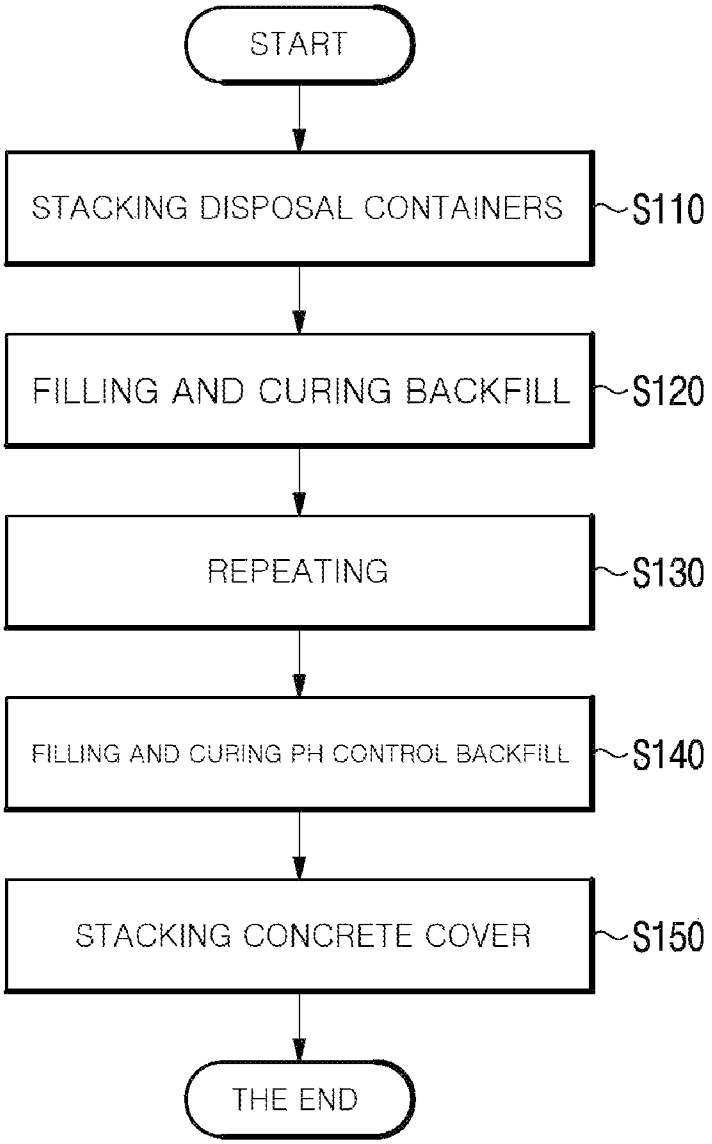
FIG. 3 illustrates a process drawing for explaining a constructing method for delaying corrosion of radioactive waste disposal container in concrete disposal vault according to the present invention.

FIG. 3 illustrates a process drawing for explaining a constructing method for delaying corrosion of radioactive waste disposal container in concrete disposal vault according to the present invention, and FIGS. 4 to 8 illustrate explanation drawings for the constructing method for delaying corrosion of radioactive waste disposal container in concrete disposal vault according to the present invention.

Referring to FIGS. 3 to 8, a constructing method for delaying corrosion of radioactive waste disposal container in concrete disposal vault according to the present invention consists of a disposal container stacking process (S10), a backfill filling process (S20), a repetitive process (S30), a pH control backfill filling process (S40) and a cover staking process (S50).

<<Disposal Containers Stacking Process—S10>>

Figure 4:
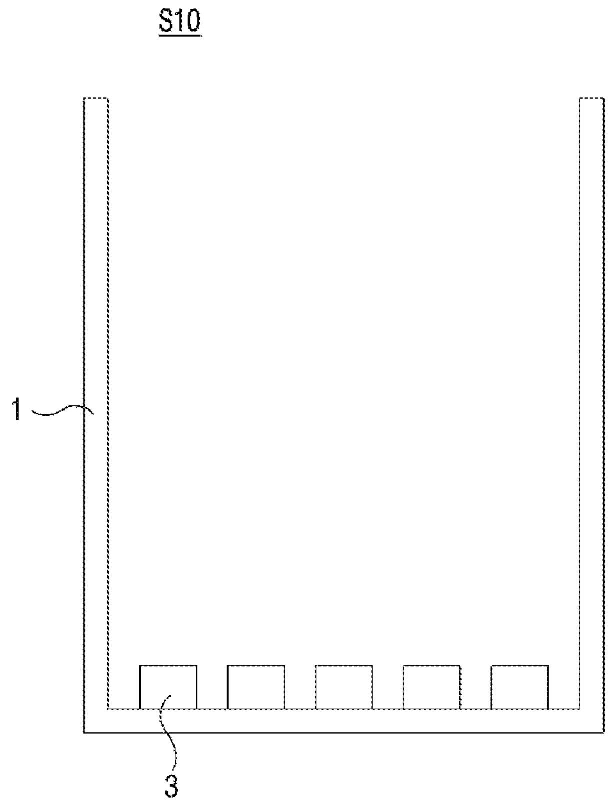
FIGS. 4 to 8 illustrate explanation drawings for the constructing method for delaying corrosion of radioactive waste disposal container in concrete disposal vault according to the present invention.

First, as illustrated in FIG. 4, disposal containers (3) in which radioactive waste is stored are mutually spaced on the surface of a prefabricated concrete vault (1), thereby stacking more than one layer. Hereinafter, the concrete mixing conditions in the concrete vault (1) are design strength (91 days, psi): 5500, the maximum water binder ratio: 35%, the maximum size of coarse aggregate: 25 mm, admixture: fly-ash, water: 247 lb/cy, cement: 578 lb/cy, fly-ash: 145 lb/cy, coarse aggregate: 1692 lb/cy, fine aggregate: 1216 lb/cy.

<<Backfill Filling Process—S20>>

Figure 5:
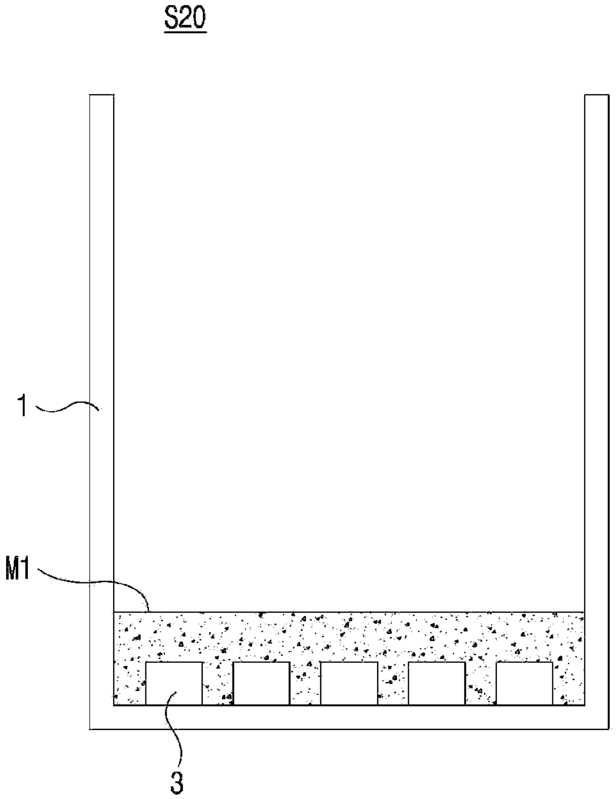

When stacking the disposal containers (3) is complete, as illustrated in FIG. 5, backfill (M1) is filled in the top of the disposal containers (3), wherein more than one layer is stacked. Hereinafter, the backfill (M1) mixing conditions are design strength (91 days, psi): 5500, the maximum water binder ratio: 35%, the maximum size of coarse aggregate: 25 mm, admixture: fly-ash, water: 247 lb/cy, cement: 578 lb/cy, fly-ash: 145 lb/cy, coarse aggregate: 1692 lb/cy, fine aggregate: 1216 lb/cy.

<<Repetitive Process—S30>>

Figure 6:
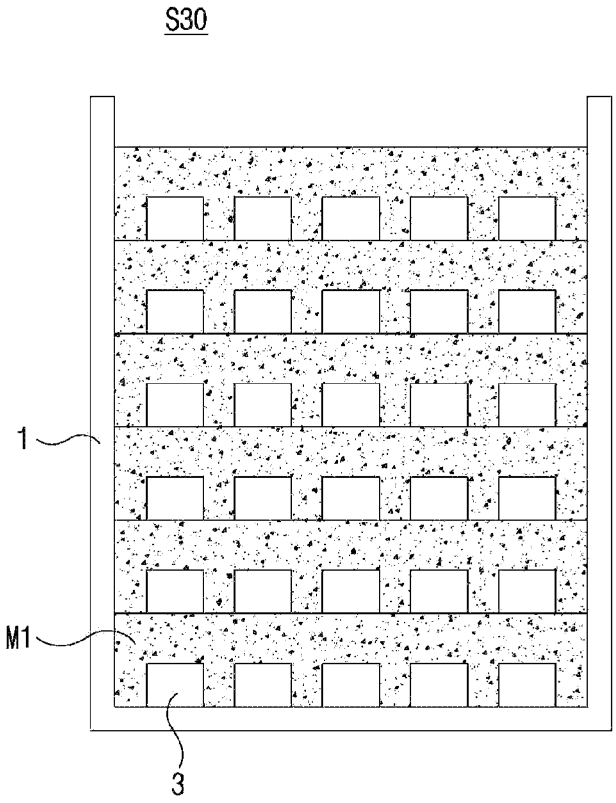

When the backfill (M1) is completely cured, as illustrated in FIG. 6, by means of consecutive repetition of the disposal containers stacking process (S10) and the backfill filling process (S20), the disposal containers (3) are stacked to the height of the concrete vault (1) and then, the backfill (M1) is filled. Hereinafter, upon filling the backfill (M1), a certain space (e.g., a height of 10-50 cm) is formed on the top of the concrete vault (1).

<<pH Control Backfill Filling Process—S40>>

Figure 7:
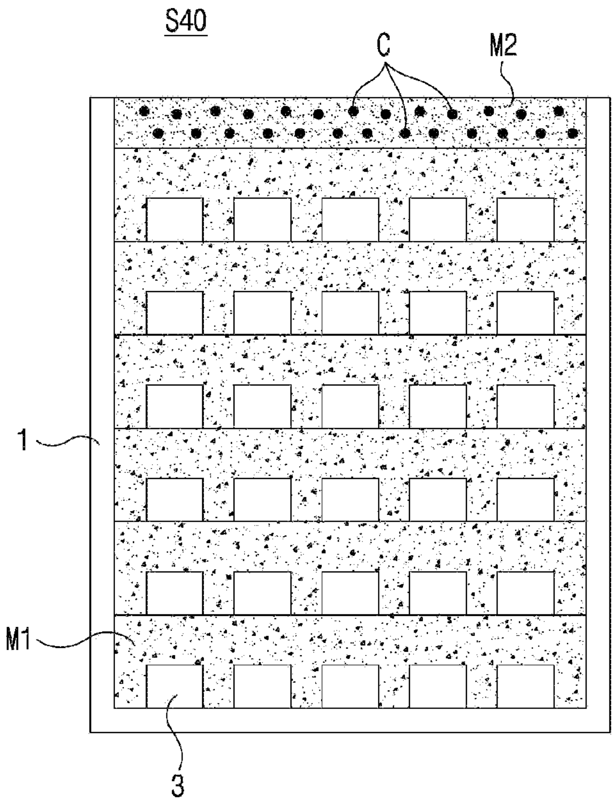

As soon as the backfill (M1) is filled, as illustrated on FIG. 7, pH control backfill (M2) combining pH control capsules (C) is filled and cured in the space formed to the top of the concrete vault (1).

Further, it is desirable that the pH control capsules (c) are equipped with alkali metal powder inside and are made up of water-soluble cellulose ether shells for dissolving in rainwater and discharging the alkali metal powder (P). Also, it is desirable that widths are all manufactured differently, thereby getting dissolved at different times.

Further, the pH control capsules (c) maintains the pH of the backfill (M1) more than pH8.6 in which the disposal containers (3) are not corroded, and the alkali metal powder (P) combines any one or more than two of sodium (Na), potassium (K), lithium (Li), rubidium (Rb), cesium (Cs) and francium (Fr).

<<Cover Staking Process—S50>>

Figure 8:
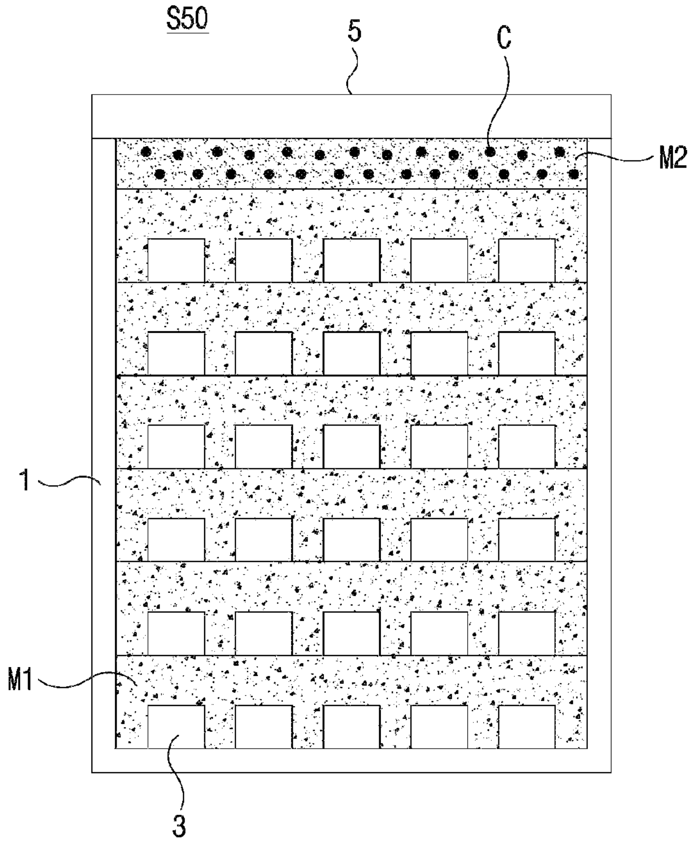

When the backfill (M1) and the pH control backfill (M2) on the top are completely cured, as illustrated in FIG. 8, a concrete cover (5) is stacked to the top of the concrete vault (1) for sealing. Hereinafter, it may be possible to delay the timing of dissolving the pH control capsules (C) in rainwater more by installing biodegradable films (not illustrated) on the upper side of the pH control backfill (M2) prior to the stacking of the concrete cover (5).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

| <Explanations of numeral reference> | |
|---|---|
| 1: concrete vault | 3: disposal containers |
| 5: concrete cover | C: pH control capsules |
| M1: backfill | M2: pH control backfill |
| P: alkali metal powder | |

The invention claimed is:

1. A constructing method for delaying corrosion of disposal containers for storing radioactive waste disposed in a concrete disposal vault, the method comprising:

a first disposal container stacking process, wherein first two or more of the disposal containers are stacked on a bottom surface of the concrete disposal vault and the first two or more of the disposal containers are spaced apart from one another;

a first backfill filling process, wherein a first backfill is filled and cured, the first backfill being defined by space formed between and over the first two or more of the disposal containers, to form a first layer including the first two or more of the disposal containers and the first backfill;

a second disposal container stacking process, wherein second two or more of the disposal containers are stacked on a top surface of the first layer and the second two or more of the disposal containers are spaced apart from one another;

a second backfill filling process, wherein a second backfill is filled and cured, the second backfill being defined by space formed between and over the second two or more of the disposal containers, to form a second layer including the second two or more of the disposal containers and the second backfill;

a repetitive process, wherein the second disposal container stacking process and the second backfill filling process are repeated to form a plurality of layers including the first layer, the second layer and a top layer, each of the plurality of layers including the respective two or more of the disposal containers and the respective backfill, such that a space is formed on the top layer at a top of the concrete vault;

a pH control backfill filling process, wherein a pH control backfill including pH control capsules is filled and cured in the space formed on the top layer at the top of the concrete vault; and a cover stacking process, wherein a concrete cover is stacked on the top of the concrete vault for sealing the concrete vault, wherein each pH control capsule includes an alkali metal powder enclosed by a water-soluble cellulose-ether shell and is configured to dissolve upon exposure to rainwater and release the alkali metal powder.

2. The constructing method according to claim 1, wherein wall thicknesses of the water-soluble cellulose-ether shells of the pH control capsules are mutually different so that the pH control capsules dissolve at different times.

3. The constructing method according to claim 1, wherein the pH control capsules maintain a pH of each of the first and second backfills at more than pH 8.6 such that the disposal containers are not corroded.

4. The constructing method according to claim 1, wherein the alkali metal powder includes only one or more than two of sodium (Na), potassium (K), lithium (Li), rubidium (Rb), cesium (Cs) and francium (Fr).

* * * * *